United States Patent [19]

Kurose et al.

[11] 4,271,436
[45] Jun. 2, 1981

[54] DIGITAL COPYING MACHINE

[75] Inventors: Morio Kurose, Yokohama; Koichi Ejiri, Chiba; Mamoru Maeda, Tokyo, all of Japan

[73] Assignee: Ricoh Co., Ltd., Tokyo, Japan

[21] Appl. No.: 33,268

[22] Filed: Apr. 25, 1979

[30] Foreign Application Priority Data

May 2, 1978 [JP] Japan ................................. 53-52343

[51] Int. Cl.³ .......................................... H04N 1/22
[52] U.S. Cl. .................................... 358/296; 358/284; 355/14 E
[58] Field of Search ................... 355/83, 35, 67, 14 E; 358/296, 284; 364/571

[56] References Cited

U.S. PATENT DOCUMENTS

| | | | |
|---|---|---|---|
| 3,488,434 | 1/1970 | Farber | 358/284 |
| 4,106,061 | 8/1978 | Burnett | 358/296 |
| 4,160,596 | 7/1979 | Joseph | 355/83 |
| 4,169,380 | 10/1979 | Mansfield | 364/571 |

Primary Examiner—James W. Moffitt
Assistant Examiner—Alan Faber
Attorney, Agent, or Firm—Oblon, Fisher, Spivak, McClelland & Maier

[57] ABSTRACT

A digital copying machine is provided with a scanner system, a data processing and transferring system, a plotter system, and a control system for controlling these system. The data processing and transferring system comprises means for converting the output of a density correcting control means provided on the control panel into digital data, and a ROM for employing as address data a value obtained by combining the digital data and a digitalized density value from the scanner system. Density values corrected in correspondence to the address data are stored in the ROM in advance to apply a density signal added by a degree of correction to the plotter system.

6 Claims, 14 Drawing Figures

DEGREE OF CORRECTION
(AMOUT OF MOVEMENT OF KNOB)

DEGREE OF CORRECTION
(AMOUT OF MOVEMENT OF KNOB)

| DENSITY | ROM LOW ADDRESS / ROM HIGH ADDRESS | DENSITY CORRECTION DEGREE | | | | | | | |
|---|---|---|---|---|---|---|---|---|---|
| | | −3 | −2 | −1 | 0 | +1 | +2 | +3 | ✕ |
| | | 0 | 1 | 2 | 3 | 4 | 5 | 6 | 7 |
| 0 | 00 | 0 | 0 | 0 | 0 | 0 | 0 | 0 | 0 |
| 1 | 10 | 0 | 0 | 0 | 1 | 2 | 3 | 4 | 0 |
| 2 | 20 | 0 | 0 | 1 | 2 | 3 | 4 | 4 | 0 |
| 3 | 30 | 0 | 1 | 2 | 3 | 4 | 4 | 4 | 0 |
| 4 | 40 | 1 | 2 | 3 | 4 | 4 | 4 | 4 | 0 |

| ROM HIGH ADDRESS \ DENSITY | ROM LOW ADDRESS \ DENSITY CORRECTION DEGREE | -3 | -2 | -1 | 0 | +1 | +2 | +3 | ✕ |
|---|---|---|---|---|---|---|---|---|---|
| | | 0 | 1 | 2 | 3 | 4 | 5 | 6 | 7 |
| 0 | 00 | 0 | 0 | 0 | 0 | 0 | 0 | 0 | 0 |
| 1 | 10 | 1 | 1 | 1 | 1 | 2 | 3 | 4 | 0 |
| 2 | 20 | 1 | 1 | 1 | 2 | 3 | 4 | 4 | 0 |
| 3 | 30 | 1 | 1 | 2 | 3 | 4 | 4 | 4 | 0 |
| 4 | 40 | 1 | 2 | 3 | 4 | 4 | 4 | 4 | 0 |

DIGITAL COPYING MACHINE

BACKGROUND OF THE INVENTION

This invention relates to digital copying machines in which picture cell data are processed after being digitalized, and more particularly to a density correcting system in the digital copying machine.

In a conventional copying machine according to an electrostatic process, the copy density is corrected by changing the exposure slit width according to indication specified by a density correcting knob on the operating panel.

In a conventional copying machine according to a diazo process, the copy density is corrected by changing the time required for applying light to a photo-sensitive material, i.e., by changing the rate of feeding a copying sheet.

In some of the copying machines according to a development process, the density is increased by adding a developer when lowered.

In these conventional density correcting methods, the copy density is, in its entirety, changed. Therefore, when the density is increased, the background becomes stained.

In the method of changing the rate of feeding a copying sheet, the copying speed is not constant. Therefore, this method is disadvantageous in that the copying speed is liable to be low.

In the method of changing the density by supplementing the developer, the rate of changing the density is low.

SUMMARY OF THE INVENTION

Accordingly, an object of this invention is to eliminate all of the above-described difficulties accompanying a conventional copying machine.

More specifically, an object of the invention is to provide a digital copying machine in which no background is stained, the information (expressed black) can be emphasized as desired, the density can be controlled irrespective of the copying speed, and the quality of an image can be controlled.

The nature, principle and utility of the invention will become more apparent from the following detailed description when read in conjunction with the accompanying drawings.

DETAILED DESCRIPTION OF THE INVENTION

Figure 1:
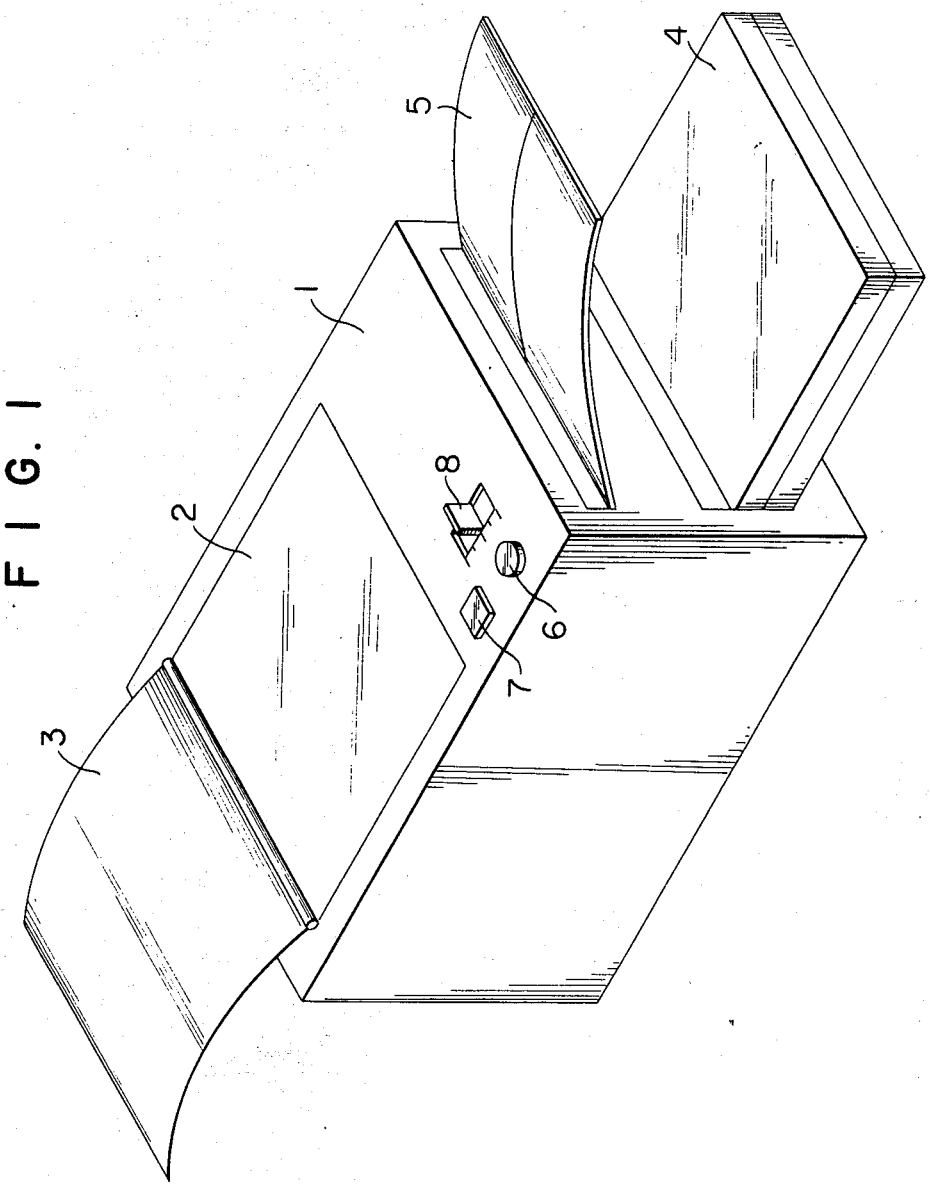
FIG. 1 is a perspective view showing one example of the external appearance of a digital copying machine according to this invention.

A digital copying machine according to this invention, as shown in FIG. 1, comprises the body 1 of the copying machine, a contact glass 2 on which an original is placed, an original holding member 3 adapted to hold an original placed on the contact glass 2, a cassette 4 containing copying sheets, a copy receiving member 5 for receiving a copied sheet, a dial 6 for specifying the number of sheet, a copy switch 7, and a density correcting knob 8.

Figure 2:
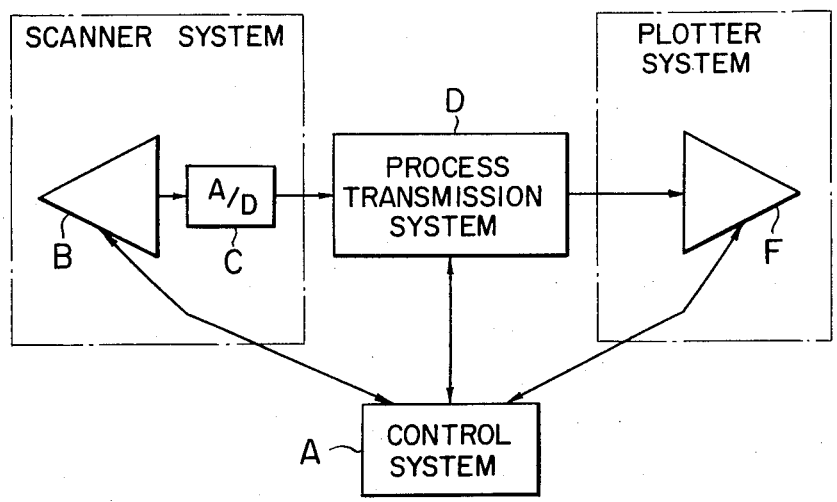
FIG. 2 is a block diagram showing the internal arrangement of the copying machine shown in FIG. 1.

FIG. 2 illustrates the entire arrangement of the copying machine according to the invention, which comprises: a control system A for controlling the functions of the copying machine; a scanner system for converting a video signal from a scanner B into digital data by means of an analog-to-digital converter C; a processing and transferring system D for carrying out processes such as for instance a density correcting process which is the key point of the invention; and a plotter system for plotting data on a copying sheet with a plotter F.

Figure 3:
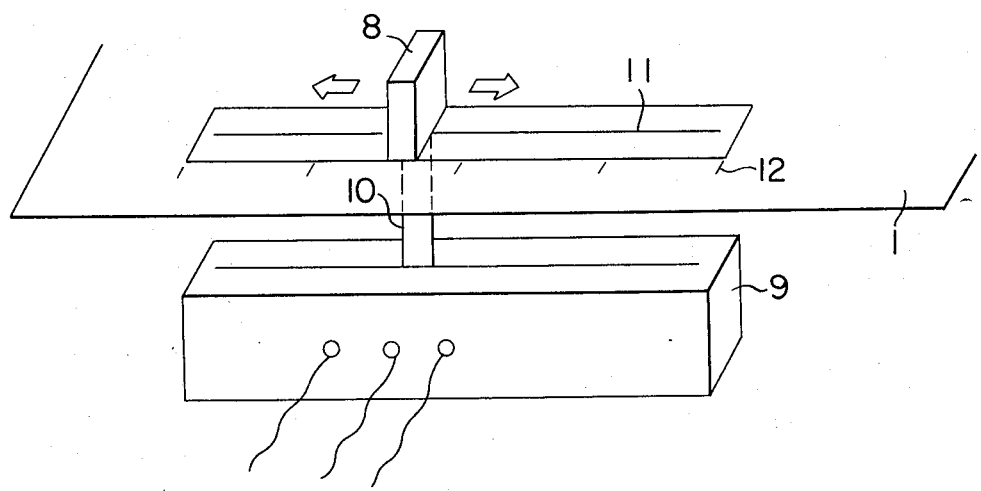
FIG. 3 is an explanatory diagram showing one example of a density correction signal control means employed in the invention.

The aforementioned knob 8 is mounted on the top part of the slider 10 of a linear type variable resistor 9, as shown in FIG. 3. The slider 10 is protruded through a slit 11 formed in the upper surface (or operating panel) of the body 1 in such a manner that it can slide along the slit 11 in the directions of the arrows. When the knob 8 is moved, a voltage corresponding to the amount of movement of the knob 8 is provided by the linear type variable resistor. A density correcting scale 12 is provided along the slit 11 on the operating panel.

The degree of correction is obtained as an electrical signal by the following means: A string 14 is laid over pulleys 13 rotatably secured to the body 1. One part of the string 14 is wound on the pulley 16 mounted at the end portion of the axis of the slider of a rotary type variable resistor 15, and another part of the string 14 is coupled to a sliding member 17 integral with the knob 8. Thus, by moving the knob 8, the slider of the rotary type variable resistor 15 is turned thereby to provide a voltage signal proportional to the amount of movement of the knob. The characteristic curve of the voltage with respect to the amount of movement of the knob may be curved as shown in FIG. 1.

Figure 4:
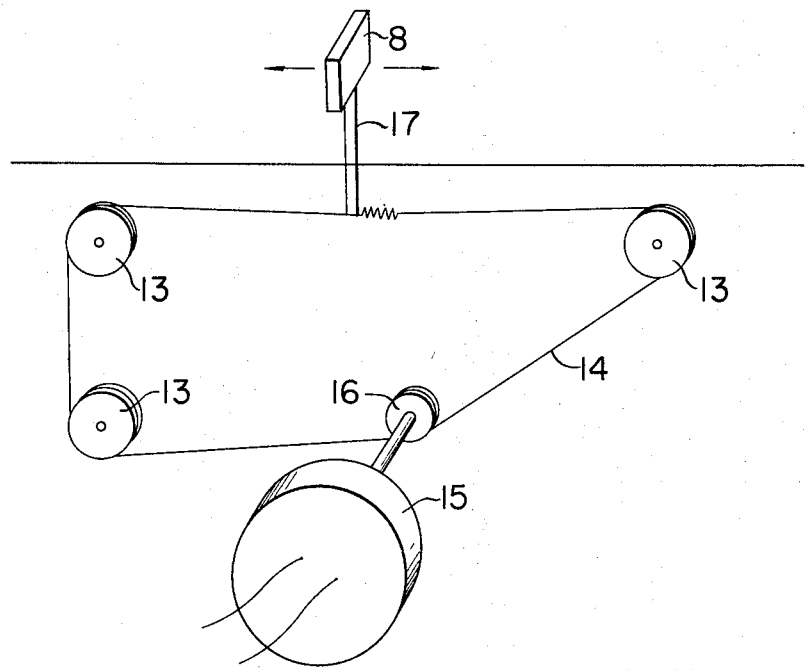
FIG. 4 is an explanatory diagram showing another example of the density correction signal control means.
Figure 5:
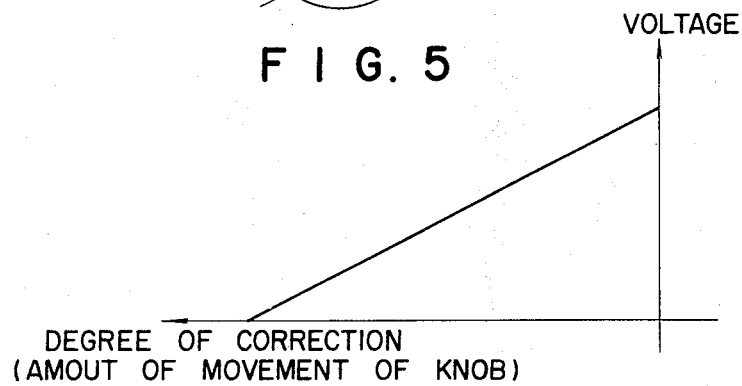
FIGS. 5 and 6 are graphical representation indicating relations between degree of correction and output voltage.
Figure 6:
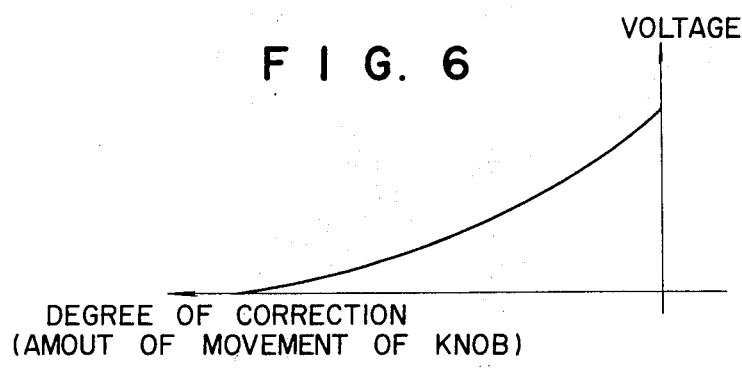
Figures 7, 8:
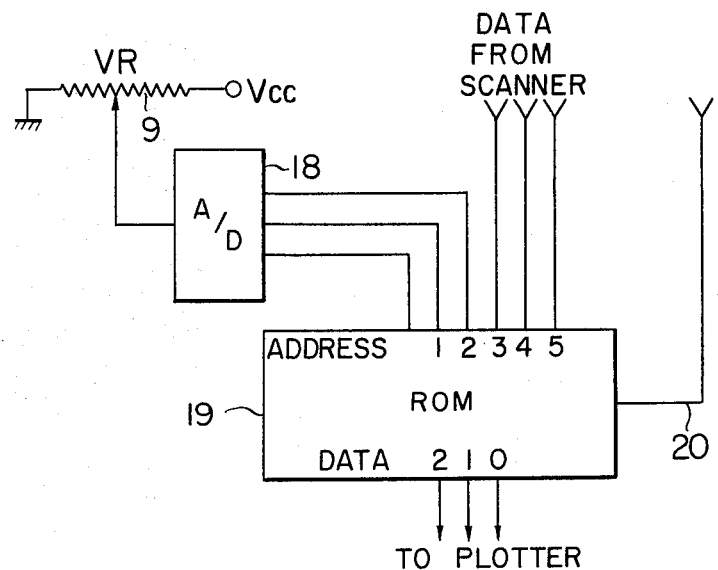
FIG. 7 is a circuit diagram illustrating one embodiment of the invention.
FIG. 8 is a diagram showing one example of the contents stored in a read-only memory shown in FIG. 7.

Shown in FIG. 7 is a density correcting circuit according to the invention, which incorporates the above-described means for providing a voltage signal corresponding to an amount of movement of the knob. More specifically, the density correcting circuit comprises: a variable resistor 9 for providing a density correction degree signal (the variable resistor 9 may be of a rotary type as shown in FIG. 4); an analog-to-digital (A/D) converter 18 for converting the voltage of the variable resistor 9 into a digital value; and a read-only memory (ROM) 19 which is so connected that it receives as address signals the data from the scanner and the data from the A/D converter 18 and that the data stored therein are read out with the aid of a data transferring clock 20 form the scanner and are transferred to the plotter.

The contents of the ROM are as indicated in FIG. 8. The output of the A/D converter 18 is employed as the low address of the ROM, while the data from the scanner is employed as the high address of the ROM. The ROM low address values 0, 1, 2, 3 ... and 6 correspond to the density correction degrees −3, −2, ... +2 and +3, respectively. Values obtained by adding these density correction degrees to the densities 0, 1, ... 4 are stored in the respective addresses (4 in maximum and 0 in minimum). The value 0 is stored in an area corresponding to the ROM low address 7.

Figure 9:
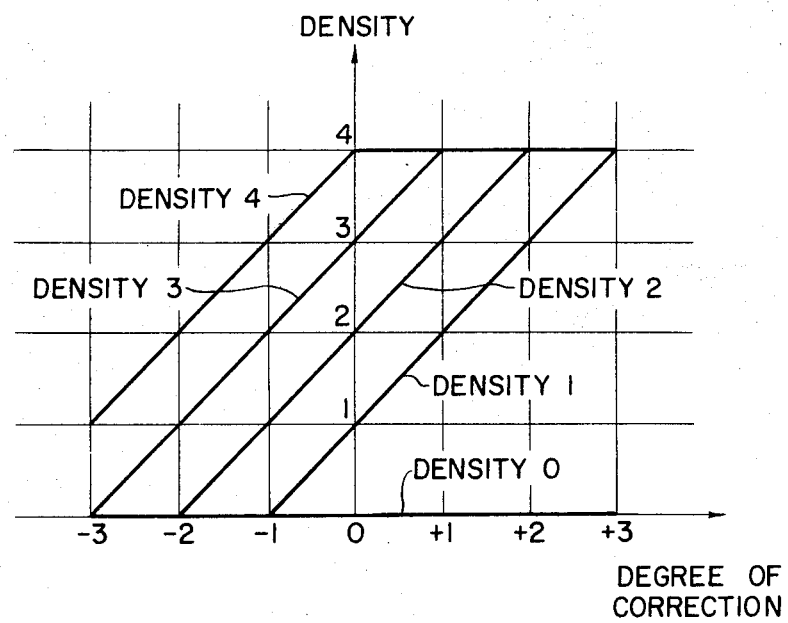
FIG. 9 is a diagram showing the algorithm of density correction concerning the contents of FIG. 8.

FIG. 9 is a diagram indicating the algorithm of density correction obtained from the contents of the ROM shown in FIG. 8.

Figure 10:
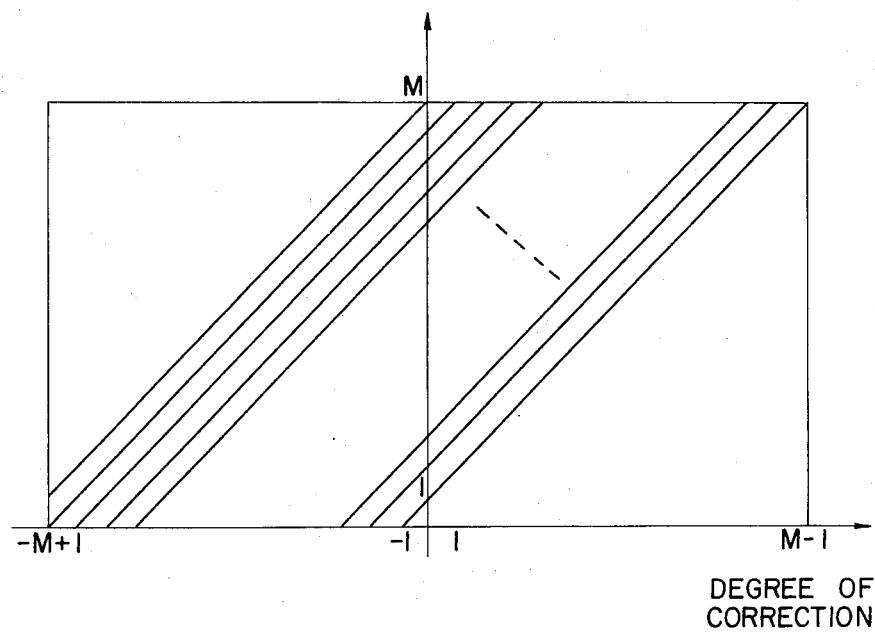
FIG. 10 is a diagram indicating a generalized algorithm of density correcting according to the invention.

In the above-described embodiment, the data have five different values, and the correction degree is represented by the values of −3 through +3. In general, if the data have M different values, then the correction degree is represented by the values of $(-M+1)$ through $(M-1)$. Therefore, its correction graph is as indicated in FIG. 10.

Figures 11, 12:
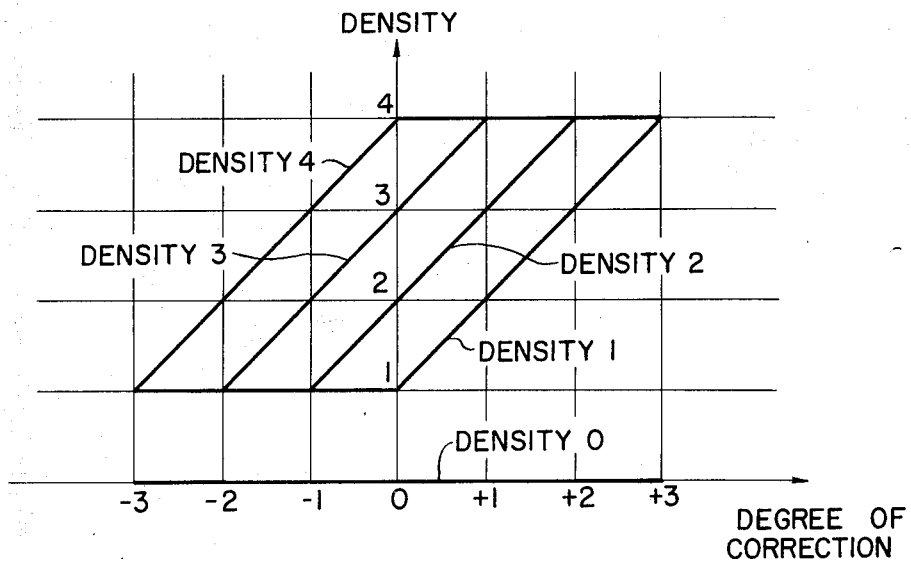
FIG. 11 is a diagram indicating another example of the contents stored in the read-only memory.
FIG. 12 is a diagram showing the algorithm of density correcting concerning the data in FIG. 11.

FIGS. 11 and 12 are for a description of a modification of the density correcting circuit shown in FIG. 7, in which the contents of the ROM are changed. In this modification, values higher than density 1 are stored at all times with the exception of the case when the data from the scanner represents density 0.

Figure 13:
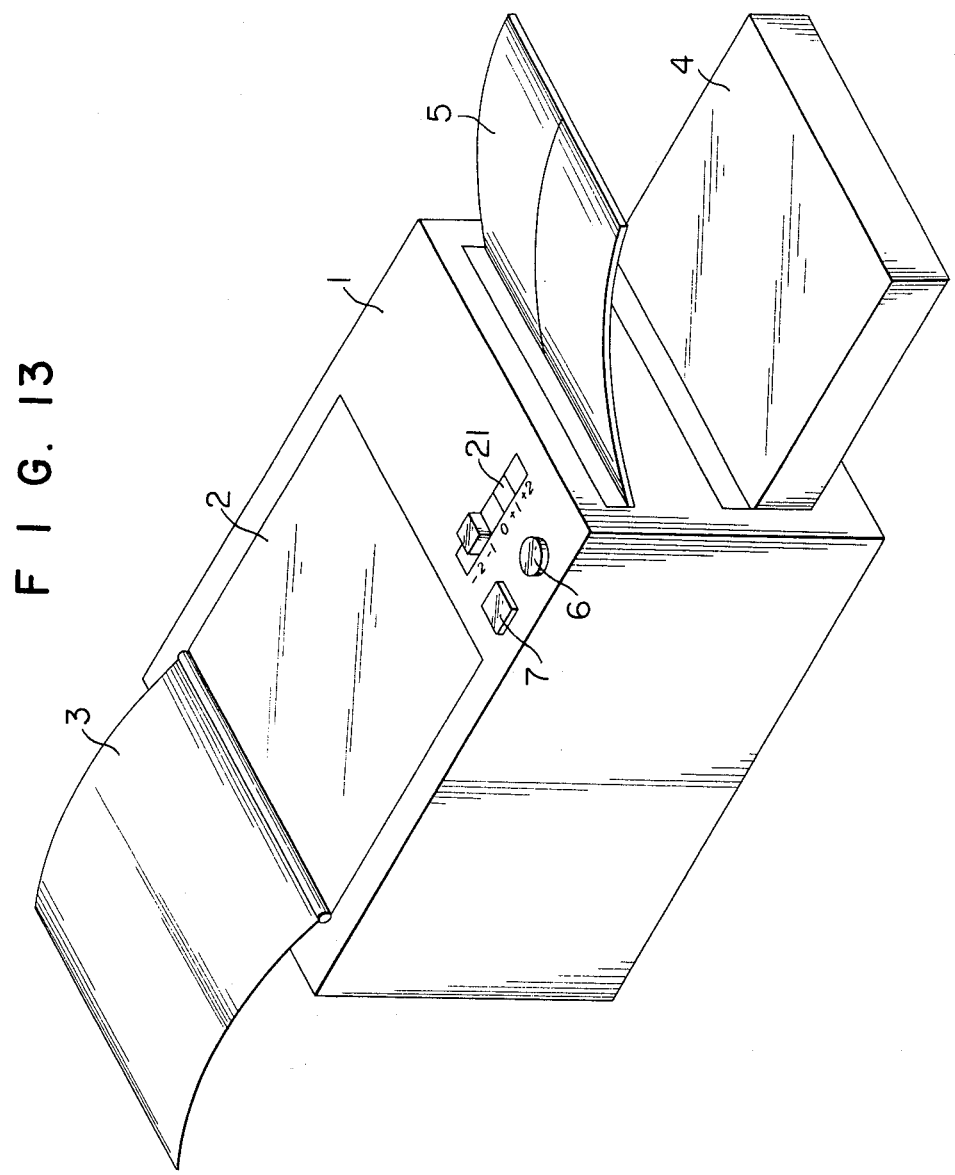
FIG. 13 is a diagram shoning another example of the density correcting control means.

Another example of the digital copying machine according to the invention is shown in FIG. 13. In this copying machine, instead of the knob shown in FIG. 1 switches 21 corresponding to the correction values +2, +1, 0, −1 and −2 are provided.

In the case where the number of density levels is smaller and the range of correction of density required is small, the copying machine employing the switching system is economical.

Figure 14:
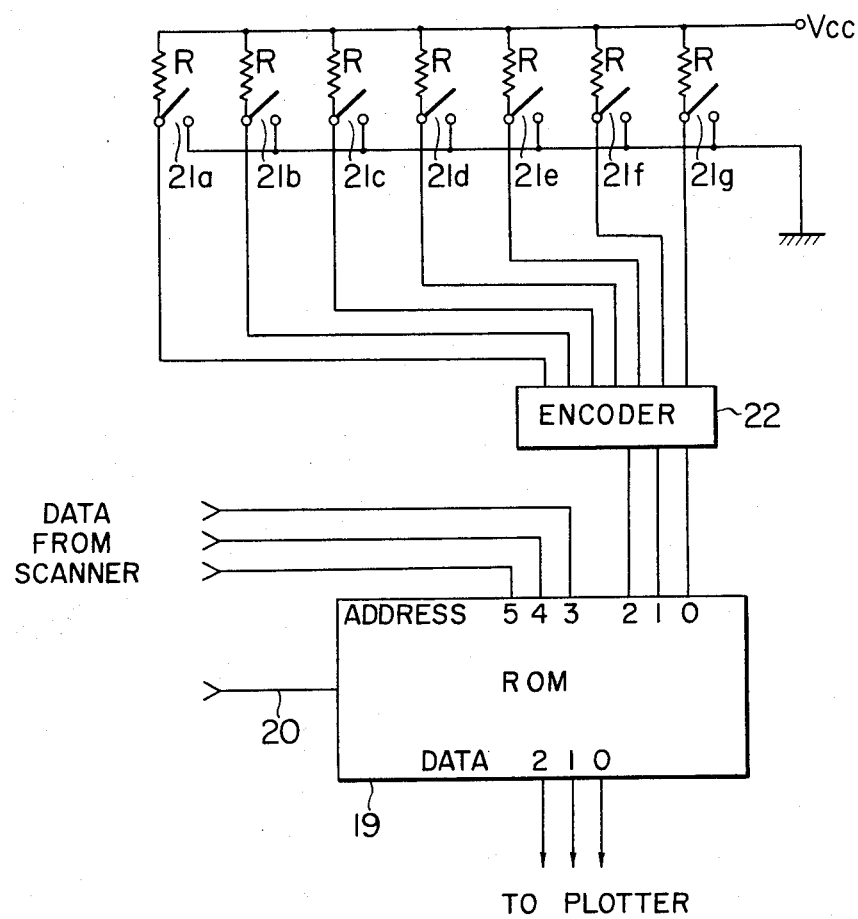
FIG. 14 shows a circuit diagram employing the control means shown in FIG. 13.

FIG. 14 is an electrical circuit for specifying the degree of correction by using the switches 21 shown in FIG. 13. A binary level signal which is changed by the operational states of switches 21a through 21g is applied to an encoder 22 to provide the low address of a ROM 19, as a result of which a density correcting signal can be produced similarly as in the previously described circuit employing the A/D converter.

As is apparent from the above description, in the copying machine according to the invention, the contents of the ROM are read out with the values as address data, which are obtained by the combination of both the multivalue level picture cell data obtained by quantizing the picture cell signals obtained by the scanning and the multi-level correction values obtained as the density correction degree, thereby to obtain the picture cell data added by the correction degrees stored in the ROM. Accordingly, a copy having a clean background can be obtained irrespective of the density correction degrees. Furthermore, the quality of the image can be adjusted, the degree of emphasis of desired information can be controlled as required, and the density can be corrected independently of the copying speed.

What is claimed is:

1. A digital copying machine which comprises:
    a scanner system for outputting an image in the form of digital data;
    a data processing and transferring system for processing and transferring said digital data;
    a plotter system for outputting data from said data processing and transferring system;
    a control system for controlling said scanner system, data processing and transferring system and plotter system; and
    density correcting control means provided on the control panel of said digital copying machine, said control means being manually adjustable,
    said data processing and transferring system comprising analog-to-digital converter means for converting the output of said control means into a digital value, and a read-only memory employing as address data a value obtained by combining said digital value provided by said analog-to-digital converter means and a digitalized density value for said scanner system, said digital value provided by said analog-to-digital converter means being a low address for said read-only memory, said digitized density value from said scanner system being a high address for said read-only memory, wherein a density signal added by a degree of correction is applied to said plotter system by storing density values corrected in correspondence to said address data in said read-only memory.

2. A digital copying machine as claimed in claim 1, in which said density correcting control means is a slider which is slidably provided in a slit formed in the control panel of said digital copying machine.

3. A digital copying machine as claimed in claim 2, in which the output of said density correcting control means is linearly proportional to an amount of movement thereof.

4. A digital copying machine as claimed in claim 2, the characteristic curve of an output of said density correcting control means with respect to an amount of movement thereof is curved.

5. A digital copying machine as claimed in claim 1, in which when said density value is represented by M different values, the corresponding correction degrees are expressed by $(-M+1)$ through $(M-1)$, respectively.

6. A digital copying machine which comprises:
    a scanner system for outputting an image in the form of digital data;
    a data processing and transferring system for processing and transferring said digital data;
    a plotter system for outputting data from said data processing and transferring system;
    a control system for controlling said scanner system, data processing and transferring system and plotter system; and
    density correcting control means provided on the control panel of said digital copying machine, for setting a digital value, said control means being manually adjustable,
    said data processing and transferring system comprising a read-only memory which employs, as address data, a value obtained by combining a digital output of said density correcting control means and a digitalized density value form said scanner system, said digital output of said density correcting control means being a low address for said read-only memory, said digitized density value from said scanner system being a high address for said read-only memory, wherein a density signal added by a degree of correction is applied to said plotter system by storing density values corrected in correspondence to said address data in said read-only memory.

* * * * *